No. 607,082. Patented July 12, 1898.
C. W. ROBINSON.
HUB.
(Application filed June 7, 1897.)
(No Model.)
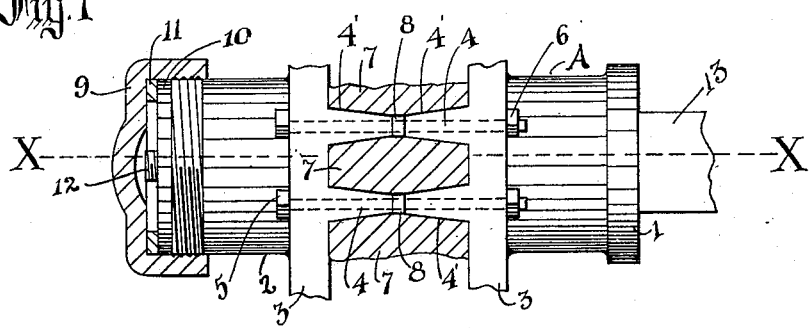
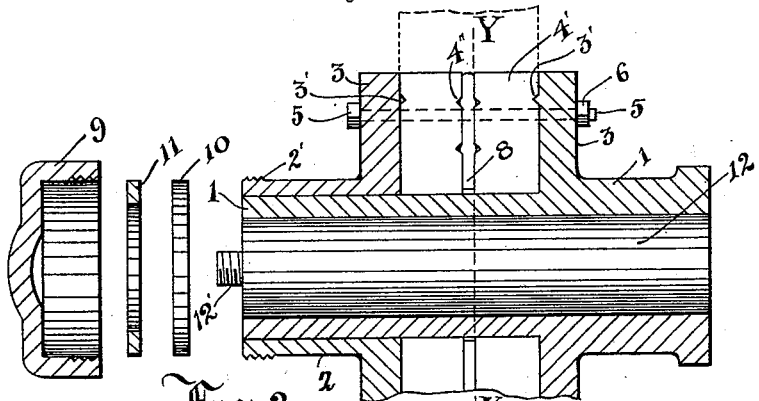
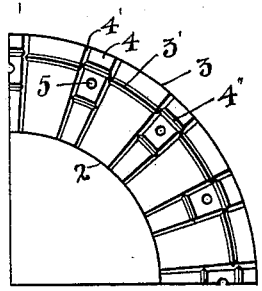
WITNESSES:
INVENTOR
BY
ATTORNEY

UNITED STATES PATENT OFFICE.

CHARLES W. ROBINSON, OF SAGINAW, MICHIGAN.

HUB.

SPECIFICATION forming part of Letters Patent No. 607,082, dated July 12, 1898.

Application filed June 7, 1897. Serial No. 639,665. (No model.)

*To all whom it may concern:*

Be it known that I, CHARLES W. ROBINSON, a citizen of the United States, residing at Saginaw, in the county of Saginaw and State of Michigan, have invented certain new and useful Improvements in Hubs; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to hubs for wagon-wheels, pulleys, and other wheels, and in particular to that class of hubs known as "divided" hubs; and it consists, essentially, of a divided spoke-socket in a divided hub and means for receiving the end thrusts without the use of a collar on the axle at the rear of the hub, as is common. It contemplates also novel features of construction and combination of the parts of the device whereby certain important advantages are attained and the device made more durable and otherwise better adapted for use.

Figure 1 is a side elevation of a hub with parts broken away. Fig. 2 is a section on line X X of Fig. 1 with spokes removed and nut and cap in detail. Fig. 3 is a section of quarter of hub on line Y Y of Fig. 2.

In the drawings, A is the hub, having the parts 1 and 2, the part 2 being a sleeve fitting over one end of the part 1 and thereby forming the hub.

3 3 are flanges or collars on the parts 1 and 2, being held together by the bolts 5, passing through the collars 3 3, firmly clamping the collars against the spokes.

Heretofore it has been common to place the spokes one against the other in the space between the collars 3 3, entirely filling up the space with the butts of the spokes. The essential feature of this part of my invention is to provide a separate and divided socket for each spoke, the socket being formed by the radial flanges 4 4 on the collars 3 3, the flanges extending inwardly and meeting in the center of the hub and forming partitions or divisions of the space between the collars 3 3, and between these partitions or flanges 4 4 I place the tenon of the spoke 7. Then by drawing the parts 1 and 2 together by means of the bolts 5 and their nuts 6 the spokes are rigidly clamped in position. In order, however, that the spokes may not become loosened by use and by action of the temperature I form a socket in such a shape that by the tightening of the bolts 5 all the looseness of the spokes in the socket will be taken up. This I do by tapering each wall of the flanges 4 4, so that they are beveled or sloping from their outer edges to the collar 3, thus forming a socket when the parts are placed together, as shown in Fig. 1, hexagonal in shape. I do not wish, however, to confine myself to this particular form of socket, as it is obvious that the flanges 4 4 may be of different form than that illustrated and accomplish the same purpose—viz., to clamp all parts of the spoke-tenons alike, so as to take up any looseness that may occur, as mentioned.

In order that the parts 1 and 2 may not be brought in such immediate contact through the flanges 4 4 as to prevent the drawing of them closer together, which would be the case if the ends of the flanges 4 4 met, I provide between each set of flanges a wedge 8 of soft material, and against this wedge the flanges are pressed by means of the bolts 5. In Fig. 2 I have illustrated corrugations 4'' along the inner edge of the flanges 4 4, which are for the purpose of so clamping the wedge 8 as to prevent it from being accidentally dislodged.

3' is a rib on the inner side of the collars 3 3 and between the flanges 4 4, and when the parts 1 and 2 are drawn together by the bolts, as described, these ribs will be embedded in the material of the spoke, and thus add to the means for securing the spoke rigidly in the socket. The bolts 5 5 pass through the collars 3 3 and the flanges 4 4 on the collars, as shown in dotted lines in Fig. 1.

As previously stated, it is common to form a collar on the axle at the rear of the hub to hold the hub in its proper position on the axle and prevent the axle sliding farther into the hub by reason of the side movement or chucking of the vehicle in passing over an uneven bed, this side movement being termed "end thrusts."

The axle 13 (shown in the drawings) has no collar such as described, the journal 12 being of the same dimensions as its axle 13. Upon the outer end of the hub I provide means for receiving these end thrusts, which consists of the nut 10, adapted to screw upon the small end 12' of the journal and hold the hub on the axle. This nut, as seen, is made flat and of the thickness desired.

Over the end of the hub A, I place a cap 9, having threads upon the inner circumference thereof, adapted to engage threads upon the hub and be thereby held upon the hub and the hub held from moving inwardly. This cap I construct of such size and form that when placed in position its inner end will engage the nut 10 or, as illustrated, a ring 11, placed in the inside of the cap. I use the ring for more convenience in adjustment and for the further reason that it can be replaced when worn.

It will be seen that when the nut and cap are placed in position the hub will be held against the nut or in such a relation thereto as it may have been adjusted, as well as the nut against the hub, and that any movement of the axle outwardly will be resisted by the cap and any movement of the hub outwardly will be resisted by the nut. This will cause some friction between the nut and hub and nut and cap; but it can be readily oiled by removing the cap or a ball-bearing used.

I am aware that it is common to cover the end of the hub with a cap in order to prevent the dust, &c., getting therein; but I am not aware that a cap and nut have been arranged as shown and described for the purpose set forth.

It will be evident from the above description of my invention that it is susceptible of considerable modification without departing materially from the principle of my invention, and for this reason I do not wish to be understood as limiting myself to the exact form of the device herein illustrated and described.

Having thus described my invention, what I claim as new, and desire to secure by Letters Patent, is—

1. In a hub, the combination with the two parts of the hub, one fitting onto the other, each part having the annular collars 3, of the beveled radial flanges 4 on each collar, extending inwardly and opposite to each other, and extending from the sleeve on the axle radially to the top of the collars 3, whereby a complete walled socket will be formed for the spokes, the rib 3' on the inside of each collar, bolt-holes through each flange in line with the hole in the opposite flange, a bolt passing through each set of opposite flanges having a nut on its end whereby the opposite flanges may be drawn together, the filling 8 of soft material between each set of opposite flanges, the transverse corrugations 4'' on the adjoining edges of the flanges for engaging the filling, the filling permitting the parts of the walled socket formed as described to be clamped around the spoke to a greater or less degree, and to take up any wear or shrinkage of the spoke, as and for the purpose set forth.

2. A hub made in two parts, one fitted upon the sleeve of the other, a complete walled and independent ribbed socket for the spokes formed by inwardly-extending radial beveled flanges on the parts of the hub, a segmental rib on each part between the flanges, means for holding the parts of the sockets in position, comprising bolts passing through the flanges, with a nut, whereby by turning upon the nut the spokes may be clamped in their sockets, means for holding the parts of the hub together consisting of a cap adapted to fit over and screw upon the outer threaded end of the hub, a nut upon the end of the axle within the cap, a ring within the cap and bearing against the nut, whereby the parts of the hub will be held together and the whole kept in its proper position on the axle, substantially as and for the purpose set forth.

In testimony whereof I hereunto affix my signature in the presence of two witnesses.

CHARLES W. ROBINSON.

Witnesses:
A. H. SWARTHOUT,
H. W. JACKSON.